3,150,984
COLORING OF REGENERATED CELLULOSE ARTICLES
Ronald L. Broadhead, Danville, Ill., assignor to Tee-Pak, Inc., Chicago, Ill., a corporation of Illinois
No Drawing. Filed Oct. 29, 1962, Ser. No. 233,875
12 Claims. (Cl. 99—176)

This invention relates to new and useful methods for coloring articles made of regenerated cellulose and more particularly is concerned with a novel method for coloring regenerated cellulose articles made from viscose by addition of whole blood to the viscose prior to extrusion and coagulation of the viscose. The regenerated cellulose product, e.g. film, casing, etc., is subsequently plasticized or softened following conventional techniques and is treated chemically or by heating to fix the proteinaceous components of the blood in the casing or film material.

In the preparation of articles of regenerated cellulose by extrusion of viscose into a coagulating medium, the in situ formation of colors has become extremely important for certain specific applications. The coloring of transparent packaging films of regenerated cellulose has become a serious problem, especially where such films are to be used in food packaging or in meat casings. The FDA standards for dyes, pigments, and other colorants used in food packaging materials have become much stricter in recent years. As a result, some manufacturers have stopped making colored packaging films because of the difficulty and expense of meeting FDA standards. It would be desirable to have dyes that are completely non-toxic so that whether or not they can be extracted by packaged foods or other materials is not important. Under present FDA regulations, one must prove the non-extractability of dyes to a lower limit that is not clearly defined or conduct expensive feeding tests on animals to prove non-toxicity under conditions of use.

In the manufacture of synthetic meat casings of regenerated cellulose, the procedures have become relatively standardized over many years of manufacturing such casings. Unreinforced or non-fibrous casings are generally made by extruding viscose through an annular die into a coagulating medium to form a tubular film of desired size and weight. In some cases, viscose is extruded through a slit to form a film or sheet of regenerated cellulose which is subsequently cemented or otherwise joined along a longitudinally extending joint to form a tube suitable for use as a casing. Fibrous casings are formed by extrusion of viscose through a die along with a fibrous reinforcing material curved into cylindrical form, followed by regeneration of the cellulose in an acid regenerating bath. The standard commercial procedure for the formation of fibrous casing involves the continuous feeding of a sheet of long fiber and paper over rollers or other guide members which cause the paper to curve into a tubular shape and pass through the extrusion die in the form of a cylinder, while the viscose solution is simultaneously extruded through the die to saturate and coat the paper. The subsequent regeneration of the viscose in the acid bath results in the formation of a tube of paper-reinforced regenerated cellulose, known in the meat packing industry as fibrous casing. Fibrous casing can also be prepared by passing a sheet of a fibrous paper through an extrusion slit along with viscose, into an acid regenerating bath so that a sheet of paper-reinforced regenerated cellulose is formed. This sheet is then formed into an elongated cylinder and cemented or otherwise joined at the edges. As previously noted, there is a substantial demands for a satisfactory method of coloring regenerated cellulose films and casings during the initial formation thereof with non-toxic colorants.

It is, therefore, one object of this invention to provide a new and improved process for the coloring of regenerated cellulose films and casings.

Another object of this invention is to provide an improved process of coloring regenerated cellulose films and casings during the formation of the film.

Still another object of this invention is to provide an improved process for coloring regenerated cellulose films and casings using inexpensive colorants which form completely non-toxic colors.

Still another object of this invention is the provision of novel colored films and casing using non-toxic colors.

A feature of this invention is the provision of an improved process for coloring regenerated cellulose films and casing by incorporation of whole blood in the viscose used to form said films, followed by a chemical or physical fixing of proteinaceous ingredients in the finished film.

Another feature of this invention is the provision of new and improved regenerated cellulose films colored with whole blood.

Other objects and features of this invention will become apparent from time to time throughout the specification and claims as hereinafter related.

SUMMARY OF THE INVENTION

This invention consists of a novel process for coloring films and casings of regenerated cellulose by the incorporation of whole blood therein and in the novel products produced by such process. As described above, the formation of films and the casings of regenerated cellulose, including non-fibrous and fibrous types, by extrusion of viscose through a straight slit or an annular slit into an acid bath or other cellulose-regenerating medium is well known in the art. As previously noted, the viscose can be extruded without reinforcing material to form an unreinforced or non-fibrous film or casing or can be extruded along with a reinforcing paper to form a fiber-reinforced film. When the viscose, either with or without fibrous-reinforcing material, is passed through an annular die, a tube of either non-fibrous or fibrous regenerated cellulose is formed which is suitable for use as a meat casing. Then the viscose, either with or without reinforcing fibrous material, is passed through a slit and regenerated. A sheet or film is formed which can be used as a packaging material or which can be formed into a tube by cementing to provide a casing suitable for use in the preparation of sausages.

In carrying out this invention, the viscose which is extruded through a die, either with or without reinforcing fibrous material, is mixed with a small amount of whole blood to form a colored homogeneous mixture which is subsequently extruded and regenerated as a colored cellulose film or casing. After regeneration of the cellulose in the film or casing is complete, the resulting film or casing is treated to fix the proteinaceous components of the blood therein. The treatment for fixing the proteinaceous material can be any of the well known processes for fixing protein. The casing or film can be heated to cause the protein to set or can be treated chemically using any of the well known chemical hardening agents for protein. It is preferred, however, to treat the regenerated film or casing with a solution of a plasticizer, such as glycerol, containing small amount of a hardening agent, such as formaldehyde.

In carrying out this invention, color hue and intensity can be controlled by variation in concentration of blood used in the viscose solution. While any animal blood (including human blood) containing hemoglobin can be used, it is preferred to use blood obtained in the slaughtering of animals for food, e.g., hogs, cattle, sheep, goats, etc. The blood is preferably diluted with water and a small amount of alkali and is then mixed with viscose in a minor proportion. It is preferred to add whole blood to the viscose in the proportion of about 0.1–10.0 g. per 100 g. of viscose, although greater or less quantities of blood can be used as may be desired for any particular coloration. In the concentration range specified, the regenerated cellulose film or casing which is produced has a color which varies from a light cream through an ivory having a yellow-gray cast. At substantially higher concentrations of blood, the color begins to include some reddish hues.

The following non-limiting examples are illustrative of the scope of this invention:

*Example 1*

About one pin of beef blood was collected using 1 g. sodium oxalate as an anti-coagulant. Fifty ml. of blood were diluted with 49 ml. water and 1 ml. of 50% aqueous sodium hydroxide. The diluted, alkaline blood was then mixed with 100 ml. of water and 400 g. of a viscose solution having a 7.0% cellulose content and 6.0% alkali content. The blood-containing viscose solution was then mixed with additional quantities of viscose and hand cast into thin films. The films were hand cast using a fibrous casing reinforcing paper and were washed and softened in a bath consisting of 15% glycerol and 3% formaldehyde in water. The glycerol functions to soften the casing film and the formaldehyde sets or hardens the proteinaceous ingredients of the blood in the film. Films were prepared from mixtures of 300 g. viscose (7.0% cellulose and 6.0% alkali content) with 10 g., 20 g., and 40 g., respectively, of the aforementioned blood-containing viscose mixture. The films which were produced ranged in color from a light cream to a dark ivory having a yellow-gray cast. The films, after treatment with glycerol and formaldehyde, were boiled in distilled water and showed no sign of leaching of the color or change in color of the film. Additional samples of the same films were also boiled for 45 minutes in a 2.5% aqueous solution of sodium chloride in a tin can similar to those used in the preparation and cooking of sausages using films of this type as sausage casings. In this case, there was no leaching of the color from the film or any discoloration of the film.

*Example 2*

The procedure of Example 1 was modified by incorporation of an oxidant in the blood-viscose mixture and was applied to the coloring of fibrous casing run on a commercial machine. Twenty-five pounds of whole beef blood were obtained from a commercial source. The blood had been stored in a freezer and contained a substantial amount of ice. The blood was allowed to thaw and a twenty-pound quantity was added to eighty pounds of cool demineralized water in a slurry feed tank while being agitated with a slow speed sweep agitator. Red foam started to accumulate on the surface immediately after addition of the blood to the water. The addition of hydrogen peroxide required approximately ten minutes. At this point, the agitator was shut off, and most of the foam was removed from the surface of the mixture. The mixture was then allowed to set for one hour and was checked for color, which was quite red.

The diluted and partially oxidized blood slurry was fed by a peristaltic pump (Pulsafeeder) to the inlet of a pipe line agitator through which viscose is fed to the fibrous casing machine. The blood slurry was blended with the viscose at a rate providing a concentration of 1% blood in the viscose mixture. The blood-containing viscose was reddish brown in color and was fed through a positive displacement pump to the extrusion die of the fibrous casing machine. In the fibrous casing machine, a long fibered hemp paper is continuously formed into an elongated cylinder and passed through an extrusion die where it is saturated with the blood-containing viscose solution and then into an acid bath where the viscose is decomposed to form regenerated cellulose throughout the reinforcing hemp paper. The color of the raw casing after regeneration of the cellulose was reddish brown. The casing was then passed through several wash baths and through a softening bath consisting of 15% aqueous glycerol containing 3% formaldehyde. The glycerol softens the regenerated cellulose, and the formaldehyde fixes the proteinaceous components of the blood dispersed in the casing wall. The casing which is prepared in this manner is satisfactory for use in the preparation of various sausages and has a dark ivory color with a slight greenish-gray cast which is very similar to natural gut casing. In addition, the casing is very adherent to dry sausage compositions, such as salami, and tends to adhere to the meat as it shrinks during curing.

Additional experimental work has shown that the intensity and shade of color of the casing can be controlled by varying the concentration of blood in the casing wall.

*Example 3*

About one pint of sheep blood is collected using 1 g. sodium oxalate as an anti-coagulant. Fifty ml. of blood are diluted with 49 ml. water and 1 ml. of 50% aqueous sodium hydroxide. The diluted, alkaline blood is then mixed with 100 ml. of water and 400 g. of a viscose solution having a 7.0% cellulose content and 6.0% alkali content. The blood-containing viscose solution is then mixed with additional quantities of viscose and formed into thin films using a hand casting technique. The films are hand cast using a fibrous casing reinforcing paper and are washed and softened in a bath consisting of 15% glycerol and 3% formaldehyde in water. The glycerol functions to soften the casing film and the formaldehyde sets or hardens the proteinaceous ingredients of blood in the film. Films are prepared from mixtures of 300 g. viscose (7.0% cellulose and 6.0% alkali content) with 10 g., 20 g., and 40 g., respectively, of the aforementioned blood-containing viscose mixture. The films which are produced range in color from a light cream to a dark ivory having a yellow-gray cast. The films which are prepared are boiled in distilled water and show no sign of leaching of the color or change in color of the film. Additional samples of the same films are also boiled for 45 minutes in a 2.5% aqueous solution of sodium chloride in a tin can similar to those used in the preparation and the cooking of sausages using films of this type as sausage casings. In this case, there is no leaching of the color from the film or any discoloration of the film.

*Example 4*

The blood-viscose mixture is prepared following the procedure of Example 1 using a viscose solution having a cellulose content of 8.1% and containing 6.55% alkali. The blood content of the mixture is 1% wt. The blood-containing viscose is extruded through an annular die into an acid bath to form an ivory colored, non-fibrous, tubular casing. The casing is washed and then treated with a solution of glycerol and formaldehyde to harden the proteinaceous components of the blood in the casing and to soften the regenerated cellulose.

*Example 5*

A viscose composition containing 1% beef blood is prepared as described in Example 4. The blood-containing viscose is extruded through a straight slit into an acid regenerating bath to form a film of regenerated cellulose having a dark ivory color as in the previous examples. The cellulose film is washed and treated with a formaldehyde-containing glycerol solution to harden the proteinaceous components of the blood and to soften the regenerated cellulose.

The synthetic casings, both fibrous and non-fibrous, produced in accordance with the foregoing examples are satisfactory for the production of sausages of many varieties. Likewise, regenerated cellulose films (non-tubular in shape), both fibrous and non-fibrous, are satisfactory packaging films and have the range of color described in the previous examples. In carrying out this invention, any of a wide variety of hemoglobin-containing animal bloods can be used as the coloring ingredient. The blood is preferably used in concentrations ranging from about 0.1–10.0 g. per 100 g. of viscose, although the concentration of about 1% wt. results in the formation of a regenerated cellulose film having a dark ivory color approximating that of natural gut casing. The blood-containing viscose compositions tend to be somewhat more stable and maintain their color longer during processing when a small amount of hydrogen peroxide is mixed with the blood. When hydrogen peroxide is used in admixture with the blood, it has been found that 0.1 to 2 parts hydrogen peroxide (3%) per part of blood is satisfactory. As described above, the color which is obtained by incorporation of blood into viscose, followed by regeneration of the cellulose and fixing of the proteinaceous components of the blood, ranges from very light cream through various shades of ivory to a reddish brown at very high blood concentrations. The desirable cream and ivory shades which are obtained at lower blood concentrations appear to result from some chemical interaction between the various components of the blood and the viscose. The exact mechanism of the color formation is not known, and the particular colors obtained at any given blood concentration must be determined by experimentation.

While this invention has been described fully and completely with special emphasis upon several preferred embodiments of the invention, it is to be understood that within the scope of the appended claims the invention may be practiced otherwise than as specifically described herein.

What is claimed is:

1. In the method of producing articles of regenerated cellulose by extrusion of viscose into a coagulating medium, the improvement which comprises mixing whole blood with water and a minor amount of alkali, and adding the mixture to the viscose, prior to coagulation of the viscose, in an amount sufficient to color the regenerated cellulose product, and hardening the proteinaceous constituents of the blood in the regenerated cellulose product.

2. A method in accordance with claim 1 in which the whole blood is added in the proportion of about 0.1–10.0 g. per 100 g. of viscose.

3. A method in accordance with claim 1 in which the whole blood is added in admixture with a small amount of hydrogen peroxide.

4. A method in accordance with claim 1 in which the whole blood is added in admixture with 0.1 to 2 parts hydrogen peroxide per part of blood.

5. A method in accordance with claim 1 in which the blood-containing viscose is extruded as a film.

6. A method in accordance with claim 1 in which the blood-containing viscose is extruded as a film reinforced with a sheet or web of fibrous cellulosic material.

7. A method in accordance with claim 1 in which the blood-containing viscose is extruded as a tubular film.

8. A method in accordance with claim 1 in which the blood-containing viscose is extruded as a tubular film reinforced with fibrous cellulosic material.

9. A colored extruded article of regenerated cellulose produced by the method of claim 1.

10. A colored extruded article of regenerated cellulose produced by the method of claim 2.

11. A synthetic sausage casing of regenerated cellulose produced by the method of claim 2.

12. A fibrous casing produced by the method of claim 2.

References Cited in the file of this patent

UNITED STATES PATENTS

| | | |
|---|---|---|
| 1,943,346 | Schwalbe et al. | Jan. 16, 1934 |
| 1,955,239 | Kampf et al. | Apr. 17, 1934 |
| 1,956,784 | Allen | May 1, 1934 |
| 2,792,313 | Charles et al. | May 14, 1957 |
| 2,934,449 | Jones | Apr. 26, 1960 |
| 2,938,800 | Sair | May 31, 1960 |
| 3,007,764 | Gage | Nov. 7, 1961 |
| 3,073,700 | Ziegler | Jan. 15, 1963 |